United States Patent [19]

Galasso et al.

[11] 4,425,407

[45] Jan. 10, 1984

[54] CVD SIC PRETREATMENT FOR CARBON-CARBON COMPOSITES

[75] Inventors: Francis S. Galasso, Manchester; Richard D. Veltri, East Hartford, both of Conn.

[73] Assignee: United Technologies Corporation, Hartford, Conn.

[21] Appl. No.: 391,615

[22] Filed: Jun. 24, 1982

[51] Int. Cl.$^3$ ............................................. B32B 9/00
[52] U.S. Cl. ...................................... 428/368; 264/81; 423/345; 427/249; 428/408
[58] Field of Search ............... 428/368, 408; 427/249; 264/81; 423/345

[56] References Cited

U.S. PATENT DOCUMENTS

| | | | |
|---|---|---|---|
| 2,992,127 | 7/1961 | Jones | 428/408 |
| 3,095,316 | 6/1963 | Hartwig | 428/408 |
| 3,226,194 | 12/1965 | Kuntz | 264/81 |
| 3,406,044 | 10/1968 | Harris | 428/408 |
| 3,853,586 | 12/1974 | Olcott | 428/408 |
| 3,925,577 | 12/1975 | Fatzer et al. | 428/408 |
| 3,935,034 | 1/1976 | Hayes | 148/6 |
| 3,969,130 | 7/1976 | Bokros | 428/408 |
| 3,980,105 | 9/1976 | Myskowski | 428/408 |
| 4,029,844 | 6/1977 | Olcott | 428/408 |
| 4,142,008 | 2/1979 | De Bolt | 428/366 |
| 4,214,037 | 7/1980 | Galasso et al. | 428/408 |
| 4,241,104 | 12/1980 | Torbet | 428/408 |
| 4,340,636 | 7/1982 | De Bolt et al. | 428/368 |

FOREIGN PATENT DOCUMENTS 2081695  2/1982  United Kingdom .

Primary Examiner—James J. Bell
Attorney, Agent, or Firm—Charles E. Sohl

[57] ABSTRACT

Carbon-carbon composites are prepared to receive a subsequent protective coating by having a thin coating (0.1 to 5 mils) of chemically vapor deposited (CVD) SiC applied to its surface. The SiC layer improves the performance of subsequent protective coatings (especially pack produced SiC conversion coatings), especially in the case of carbon-carbon composites having a negative coefficient of thermal expansion.

5 Claims, 1 Drawing Figure

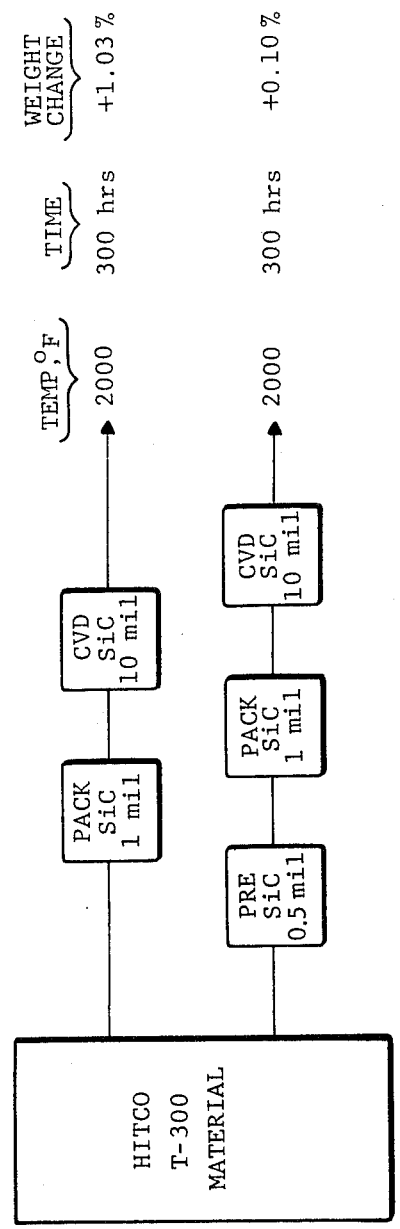

CVD SIC PRETREATMENT FOR CARBON-CARBON COMPOSITES

DESCRIPTION

1. Technical Field

This invention concerns coating for carbon base materials, and particularly multilayer or composite coatings for carbon-carbon composite materials.

2. Background Art

Carbon-carbon composites are a class of unique materials whose properties, especially at elevated temperatures, make them attractive for various aerospace applications. The materials are composites although all of the composite elements are comprised essentially of carbon, in its various allotropic forms. Carbon-carbon materials are produced starting with organic precursor fibers such as polyacrylonitrile, rayon or pitch. Such fibers are usually produced in bundles (yarn), often by an extrusion process. The precursor fibers are heated in an inert atmosphere to pyrolyze or carbonize them and may then be heated to a higher temperature (e.g. 4000° F., 2204° C.) to form graphite fibers. These carbon or graphite materials may then be laid down, woven, or interleaved to form what are referred to as 1D, 2D, 3D, etc. structures where D stands for direction (i.e. in a 2D structure, fibers are laid in two (usually orthogonal) directions).

These woven structures can then be impregnated with a pitch or resin material which is converted to carbon and then graphite. In this process, hot pressing can also be employed to obtain a dense structure. Repeated impregnation steps can be employed to increase density.

An alternative processing scheme is to use chemical vapor deposition (CVD) to deposit a pyrolytic graphite matrix.

The finished product is 90+% carbon, but by virtue of the fiber alignment and other processing details, has exeptional mechanical properties when compared with other materials. The mechanical properties are constant, or even increase slightly with temperatures up to about 4000° F. (2204° C.). This temperature capability makes carbon-carbon materials exceptionally attractive for various aerospace applications including gas turbine engines. The obvious drawback is the inherent susceptibility of carbon-carbon materials to oxidation. The present invention concerns a coating system to protect carbon-carbon materials from catastrophic oxidation at temperatures up to at least 2500° F. (1371° C.).

It is known in the prior art to use SiC conversion coatings to protect carbon base materials, including carbon-carbon composites. Such coatings are termed conversion coatings because the surface of the article to be coated is converted to SiC by reacting it with silicon. Pack coating processes are popular. A carbon article can be embedded and heated in a pack material which will produce Si or Si compound vapors when heated. U.S. Pat. No. 3,095,316 describes pack processes for producing SiC coatings on carbon base articles. Processes using pack compositions based on $Al_2O_3$, Si and $SiO_2$ are known.

U.S. Pat. No. 3,226,194 describes a chemical vapor deposition (CVD) process for applying SiC coatings.

U.S. Pat. No. 3,406,044 describes methods for coating graphite heating elements. In one embodiment, a silicon containing gas is decomposed on a heated graphite surface to produce a layer of pure silicon which is then melted so that it reacts with the carbon. Subsequently, a layer of CVD SiC is applied. The coating is employed on graphite heaters used in semiconductor processing equipment and prevents vaporization of the graphite which would adversely affect the semiconductor materials.

U.S. Pat. No. 3,925,577 describes a similar process involving deposition of pure silicon on a carbon surface, heating to above the melting point of silicon to react the silicon and carbon and a final CVD layer of SiC.

D. C. Roger et al have described carbon-carbon materials and a varitey of surface coatings (mostly pack type), in three articles: (1) "Society for the Advancement of Material and Process Engineering, Conference Proceedings 1973", pp. 205-215; (2) "Society for the Advancement of Material and Process Engineering, Conference Proceedings 1975", pp. 319-336; and (3) "Society for the Advancement of Material and Process Engineering, Conference Proceedings 1976", pp. 308-337.

It is an object of the invention to describe an improved precoating upon which other coatings can be applied to render the substrate highly resistant to oxidation at elevated temperatures.

DISCLOSURE OF INVENTION

According to the present invention, carbon-carbon composite materials are prepared to receive a subsequent SiC conversion coating by having a thin coating of CVD (chemically vapor deposited) SiC applied to the surface to be coated. The CVD SiC layer is thin (0.1 to 5 mils), dense and adherent and may be applied by flowing a mixture of methane, hydrogen, and methylidichlorosilane (about 100:100:14) at a reduced pressure (2-20 Torr) over the substrate which is heated to an elevated temperature (1000° C.-1200° C.). The thickness of the subsequent SiC conversion coating preferably exceeds the thickness of the CVD SiC layer, i.e. the subsequent diffusion coating is preferably applied under conditions which result in diffusion of Si into the substrate. The presence of the CVD SiC layer renders the subsequent SiC conversion coating substantially more protective.

The foregoing, and other features and advantages of the present invention, will become more apparent from the following description and accompanying drawing.

BRIEF DESCRIPTION OF THE DRAWING

The FIGURE is a flow chart illustrating the invention and the performance benefits obtained by the invention.

BEST MODE FOR CARRYING OUT THE INVENTION

Carbon-carbon composites may be protected from oxidation by converting the surface of the material to an oxidation resistant material. One commonly used family of coating processes utilizes silicon to convert the surface of carbon-base materials to silicon carbide. For example, the carbon-carbon composite material may be dipped in or otherwise contacted with molten silicon or exposed to silicon vapor to cause the surface of the material to be converted to silicon carbide. The most common coating technique employed in connection with carbon-carbon composites is a pack coating technique which develops a thin layer of silicon carbide on the surface. This is a form of vapor deposition and uses a pack which produces vapor of silicon and/or decomposable silicon compounds. Thus, for example, a carbon-carbon article may be embedded in powder mixture containing (by weight) 10% $Al_2O_3$, 60% SiC, and 30% Si, and the pack and article may then be heated to a temperature of about 1600° C. for a period of several hours (e.g. 8 hours) during which time, a silicon carbide conversion surface layer is produced. The surface layer is produced by the vapor transport of silicon or a metastable silicon compound(s) from the pack material to the article and the subsequent combination or reaction of the silicon with surface and subsurface carbon to form the desired silicon carbide.

It is highly desired that the silicon carbide surface coating be uniform in thickness and density so as to afford uniform resistance to oxidation. In carbon-carbon materials, composed of graphite fiber in a graphite matrix, diffusion of silicon through the fibers will usually occur at a different rate than diffusion of silicon within the matrix material. Even within the fibers the diffusion of silicon may occur at different rate depending upon whether the diffusion direction is in the radial or axial direction. This uneven diffusion behavior coupled with the possibility that the carbon-carbon material may not be 100% dense, often leads to the production of an undesirable variable thickness surface coating.

The present invention substantially avoids this problem by providing on the surface of the carbon-carbon composite material, a thin initial continuous layer of CVD (chemically vapor deposited) SiC. For reasons not entirely understood, this results in a surprising degree of uniformity, of oxidation protection, in any subsequently applied diffusion or conversion SiC layer. In particular, this precoat with CVD SiC produces outstanding results on carbon-carbon material having a negative coefficient of thermal expansion.

Preferred conditions for depositing CVD SiC on the surface of the carbon-carbon material are to heat the substrate to a temperature of between 1000° C. and 1200° C. while maintaining the substrate in a reduced pressure chamber at a pressure of 2-20 Torr while flowing a mixture of methane, hydrogen, and methyldichlorosilane over the surface of the sample. The preferred ratio of methane to hydrogen to methyldichlorosilane is about 100:100:14. In the case of a small chamber having a 2 inch (5.08 cm) inside diameter of 4 inch (10.16 cm) length, 100 cc/min of $CH_4$ and $H_2$ and 13.6 cc/min of methyldichlorosilane were flowed through the chamber to produce the desired coating. The coating thickness is preferably from 0.1 to 5 mils and can be produced in about 1-4 hours under the described conditions.

After the silicon carbide coating is applied, other coatings can be applied including, and preferred, a pack derived SiC conversion coating. We prefer to use a pack deposition process employing a pack mixture containing about 10% $Al_2O_3$, about 60% SiC and about 30% Si powder. Especially desirable results are obtained by adding a small amount of boron to this pack mixture, on the order of 1%, as described in commonly assigned U.S. patent application Ser. No. 391,613 entitled "Deposition of Improved SiC Conversion Coatings on Carbon-Base Materials" filed on even date herewith. This pack mixture provides a suitable silicon carbide conversion coating when it is heated to a temperature of about 1500° C.–1700° C. The coating time is preferably controlled so that the depth of diffusion during this process exceeds the depth of the initial CVD silicon carbide layer, thereby ensuring that it is bonded to the original carbon-carbon substrate. Subsequently, various other protective coating layers may be applied.

The CVD SiC precoat of the present invention provides particular benefits when applied to carbon-carbon materials having low, (e.g. $<0.3$–$10^{-6}$ cm/cm/° C. or negative values for the coefficient of thermal expansion. Composite materials such as the fiber reinforced carbon-carbon materials have coefficients of thermal expansion which vary according to relative direction in the material. Particularly, the coefficient will be different in the fiber direction than transverse to the fiber direction. The controlling coefficient of expansion is usually the lowest value in a direction lying on the plane to be coated.

The efficacy of the CVD SiC precoat is shown in the FIGURE which illustrates the processing applied to two samples of HITCO T-300 material, a 2D carbon-carbon material having a coefficient of thermal expansion of about $-0.7$ in/in/° F. ($-0.4$ cm/cm/° C.) in the x and y directions. It can be seen that the introduction of a CVD SiC precoat layer of about 1.5 mils in thickness provides a coating which displays essentially total resistance to oxidation at 2000° F. (1093° C.) for 300 hours. A reduction in oxidation of 90% is provided by the simple addition of this thin layer.

Although this invention has been shown and described with respect to detailed embodiments thereof, it will be understood by those skilled in the art that various changes in form and detail thereof may be made therein without departing from the spirit and scope of the claimed invention.

We claim:

1. A carbon-carbon composite article having carbon fibers surrounded by a carbon matrix characterized in that diffusion of silicon within the fibers occurs at a different rate than does the diffusion of silicon within the matrix, said article being adapted to receive a subsequent uniform protective coating, said article comprising:

carbon-carbon composite substrate having on its outer surface, a 0.1 to 5 mil layer of CVD SiC.

2. A carbon-carbon composite as in claim 1 having a coefficient of thermal expansion less than about $0.3 \times 10^{-6}$ cm/cm° C.

3. A method of preparing a carbon-carbon composite article to receive a protective coating which comprises applying a 0.1 to 5 mil layer of CVD SiC, so that compositional and crystallographic variations in the carbon-carbon article are masked and do not affect the subsequent protective coating.

4. In a process for coating a carbon-carbon surface to resist attack at elevated temperatures, the improvement which comprises: applying a 0.1–1.5 mil layer of CVD SiC to the carbon-carbon surface prior to applying a protective coating; whereby the compositional and crystallographic variations in the surface are masked.

5. A method for masking and minimizing the effects of compositional and crystallographic variations in the surface of a carbon-carbon composite material, so that these variations do not significantly affect the protective capabilities of a subsequently applied coating; which comprises applying a 0.1–1.5 mil layer of CVD SiC to the carbon-carbon surface.

* * * * *